United States Patent [19]
Shapiro et al.

[11] 3,896,220
[45] July 22, 1975

[54] METHOD OF TREATING FUNGAL INFECTIONS WITH AZIDO COMPOUNDS

[75] Inventors: Elliot L. Shapiro; Ashit K. Ganguly, both of Cedar Grove, N.J.

[73] Assignee: Schering Corporation, Kenilworth, N.J.

[22] Filed: Apr. 18, 1974

[21] Appl. No.: 462,055

Related U.S. Application Data

[62] Division of Ser. No. 269,347, July 6, 1972, Pat. No. 3,816,472.

[52] U.S. Cl. .............................................. 424/226
[51] Int. Cl. ............................................ A61k 27/00

[58] Field of Search ..................................... 424/226

[56] References Cited
OTHER PUBLICATIONS

Stephenson et al., J. Chem. Soc., pp. 1282–1292 (1962).

*Primary Examiner*—Jerome D. Goldberg
*Attorney, Agent, or Firm*—Bruce M. Eisen; Stephen B. Coan

[57] ABSTRACT

Disclosed herein are novel azido compounds, useful as antifungal agents.

3 Claims, No Drawings

METHOD OF TREATING FUNGAL INFECTIONS WITH AZIDO COMPOUNDS

This is a division of application Ser. No. 269,347 filed July 6, 1972 now U.S. Pat. No. 3,816,472.

This application relates to novel chemical compounds and to their use in treating fungal infections.

These compounds can be considered as azido analogs of griseofulvin and may be represented by the following structural formula:

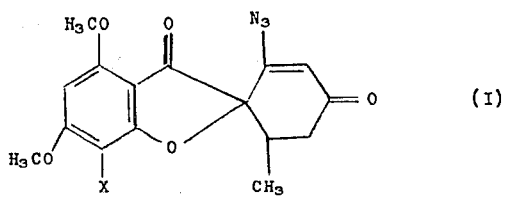

wherein X is hydrogen, bromine, chlorine or fluorine. In the preferred embodiment, X is chlorine.

The compounds of formula I may be prepared by the reaction of the corresponding 2'-chloro compound (II) with sodium azide in a suitable vehicle such as dimethylformamide as represented by the following reaction scheme:

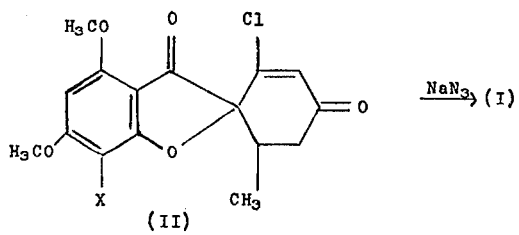

wherein X has the above meaning. The preparation of the 2'-chloro compounds of formula II is described in Stephenson et al., J. Chem. Soc., 1282 – 1292 (1962).

The following example is illustrative of the preparation of the compounds of this invention:

EXAMPLE 1

Preparation of 2'-azido-7-chloro-4,6-dimethoxy-6'methylgris-2'-en-3,4'-dione

A suspension consisting of 1.0 gram of 7,2'-dichloro-4,6-dimethoxy-6'-methylgris-2'-en-3,4'-dione, 2.0 grams of sodium azide, and 20 ml. of dimethylformamide is stirred at room temperature for 4.5 hours. Addition of this suspension to water and collection of the resulting precipitate yields 0.99 grams of the title compound, which upon crystallization from a mixture of methylene chloride and diethyl ether has a melting point of 153° – 156°C.

In a similar manner, one can prepare corresponding bromo, fluoro, and deschloro compounds by substituting the corresponding compound of formula II in the above example.

The compounds of this invention can be used to treat diverse types of fungal infections. Their antifungal spectrum and potency is similar to that of griseofulvin. They are fungistatic against various species of Microsporum, Epidermophyton and Trichophyton.

Thus, the compounds of this invention can be used for the treatment of ringworm infections of the skin, hair and nails, namely: *Tinea corporis, Tinea pedis, Tinea cruris, Tinea barbae, Tinea capitis, Tinea unguium* (onychomycosis) when caused by one or more of the following genera of fungi: *Trichophyton rubrum, Trichophyton tonsurans, Trichophyton mentagrophytes, Trichophyton interdigitalis, Trichophyton verrucosum, Trichophyton megnini, Trichophyton gallinae, Trichophyton crateriform, Trichophyton sulphureum, Trichophyton schoenleini, Microsporum audouini, Microsporum canis, Microsporum gypseum* and *Epidermophyton floccosum*.

The compounds of this invention are preferably orally administered in an amount within the range of 4 to 30 mg./kg. depending on the nature and severity of the invention. This daily amount may be provided as a single dose or in divided amounts. This treatment is continued until the susceptible infecting organism is completely eradicated as indicated by appropriate clinical or laboratory examination. This time may represent weeks or even months, again depending on the nature and severity of the infection.

Compositions suitable for oral administration are the known pharmaceutical forms for such administration, namely tablets, pills, syrups, and aqueous or oily suspensions and the excipients used in the production of these formulations are the excipients well known to the pharmacist's art, as are also the means of formulation.

Tablets are a preferred dosage form and may be prepared in the conventional manner from a mixture of a compound of this invention generally together with an inert diluent (e.g. calcium carbonate or lactose), a disintegrating agent (e.g. maize starch), and a lubricating agent (e.g. magnesium stearate). For the treatment of fungal infections in animals by oral administration, the compound of this invention may first be incorporated into suitable food premixes and the said premixes then used for incorporation into animal foodstuffs.

Aqueous suspensions for oral use may also be utilized containing a compound of this invention in aqueous media in the presence of a suitable non-toxic suspending agent (e.g. sodium carboxymethylcellulose) and a suitable dispersing agent. Suitable dispersing agents may be lecithin, condensation products of ethylene oxide with fatty acids (e.g. polyoxyethylene stearate) or with fatty alcohols (e.g. heptadecaethyleneoxycetanol) or with partial esters derived from the fatty acids and hexitols (e.g. polyoxyethylene sorbitol hexaoleate) or with partial esters derived from the fatty acids and hexitol anhydrides (e.g. polyoxyethylene sorbitan mono-oleate). Oily suspensions for oral use may be formulated in a suitable vegetable oil (e.g. arachis oil) which may contain suitable sweetening agents and preservatives.

The following example illustrates the preparation of suitable tablets.

EXAMPLE 2

500 parts by weight of 2'-azido-7-chloro-4,6-dimethoxy-6'-methylgris-2'-en-3,4'-dione are mixed with 70 parts by weight of calcium carbonate and 200 parts by weight of a 10 percent maize starch paste are added. The mixture is dried and is then passed through a 16-mesh screen. 5 parts by weight of magnesium stearate are added and the granules are compressed to give tablets suitable for oral administration.

The compounds of this invention can also be topically administered. Ointments and creams thereof can be prepared in the conventional manner. Aerosols for topical administration can also be prepared in the conventional manner, employing, for example, isopropyl myristate and Freon 11 and Freon 12 as propellants. The following example illustrates an antifungal ointment within the scope of this invention.

EXAMPLE 3

| | |
|---|---|
| 2'-azido-7-chloro-4,6-dimethoxy-6'-methylgris-2'-en-3,4'-dione | 1.00 g. |
| propylene glycol monostearate | 12.00 g. |
| stearic acid | 6.00 g. |
| isopropyl myristate | 8.00 g. |
| propylene glycol | 3.00 g. |
| polyoxyethylene sorbitan palmitate | 6.00 g. |
| methyl paraben | 0.10 g. |
| butyl paraben | 0.18 g. |
| purified water to make | 63.72 g. |

Melt together the propylene glycol monostearate, stearic acid, isopropyl myristate and polyoxyethylene sorbitan palmitate and disperse the cooling melt in the water-propylene glycol solution to which the parabens have been added. Then disperse the azido compound in the resulting emulsion and cool to room temperature.

Numerous variants of the above compounds and methods will be apparent to one skilled in the art within the scope of this invention.

We claim:

1. A method for treating fungal infections comprising administering to a mammal infected with a fungus, a fungistatically effective amount of a compound represented by the structural formula:

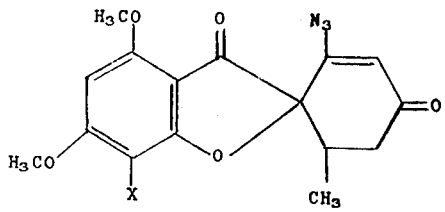

wherein X is hydrogen, bromine, chlorine or fluorine.

2. A method according to claim 1 wherein X is chlorine.

3. A method according to claim 2 wherein said treating comprises orally administering.

* * * * *